(12) United States Patent
Hirayama

(10) Patent No.: US 6,738,676 B2
(45) Date of Patent: May 18, 2004

(54) CONTROLLER HAVING PID SELECTION FUNCTION

(75) Inventor: Hirohumi Hirayama, Tokyo (JP)

(73) Assignee: Yamatake Corporation, Tokyo (JP)

( * ) Notice: Subject to any disclaimer, the term of this patent is extended or adjusted under 35 U.S.C. 154(b) by 0 days.

(21) Appl. No.: 10/341,362

(22) Filed: Jan. 14, 2003

(65) Prior Publication Data
US 2003/0144749 A1 Jul. 31, 2003

(30) Foreign Application Priority Data
Jan. 25, 2002 (JP) ......................... 2002-017347

(51) Int. Cl.[7] .................. G05B 13/02; G05D 15/00
(52) U.S. Cl. ................... 700/42; 236/78 D; 318/610; 700/50
(58) Field of Search ............... 236/78 D; 700/42, 700/43, 50; 318/610

(56) References Cited

U.S. PATENT DOCUMENTS 5,748,467 A * 5/1998 Qin et al. ............ 700/43 X
6,081,751 A * 6/2000 Luo et al. ............... 700/42

FOREIGN PATENT DOCUMENTS

JP 0263516 * 11/1987 ............ 236/78 D

* cited by examiner

Primary Examiner—William Wayner
(74) Attorney, Agent, or Firm—Rothwell, Figg, Ernst & Manbeck (57) ABSTRACT

A controller (1) has a fuzzy calculation means (64) for performing a fuzzy calculation in order to calculate a PID value (P, I, D) based on a switch time T, a PID value ($P_1$, $I_1$, $D_1$) before switching of the PID value, and a PID value ($P_2$, $I_2$, $D_2$) after the switching. The switch time T is obtained by manual through the switch time input means (7) or by calculating it automatically. The PID value ($P_1$, $I_1$, $D_1$) is stored in a PID value storage means (62), and the PID value ($P_2$, $I_2$, $D_2$) is stored in a PID value storage means (63).

9 Claims, 7 Drawing Sheets

TIMING CHART OF PROCESS BY PID VALUE DETERMINATION MEANS 6

AT TIME t1
$P = P_1 \times a + P_2 \times (1-a)$
$I = I_1 \times a + I_2 \times (1-a)$
$D = D_1 \times a + D_2 \times (1-a)$
$a = \dfrac{t}{T}$

CONTROLLER HAVING PID SELECTION FUNCTION

BACKGROUND OF THE INVENTION

1. Field of the Invention

The present invention relates to a controller having a PID selection function capable of performing stable PID control during a change of a PID value.

2. Description of the Related Art

Figure 6:
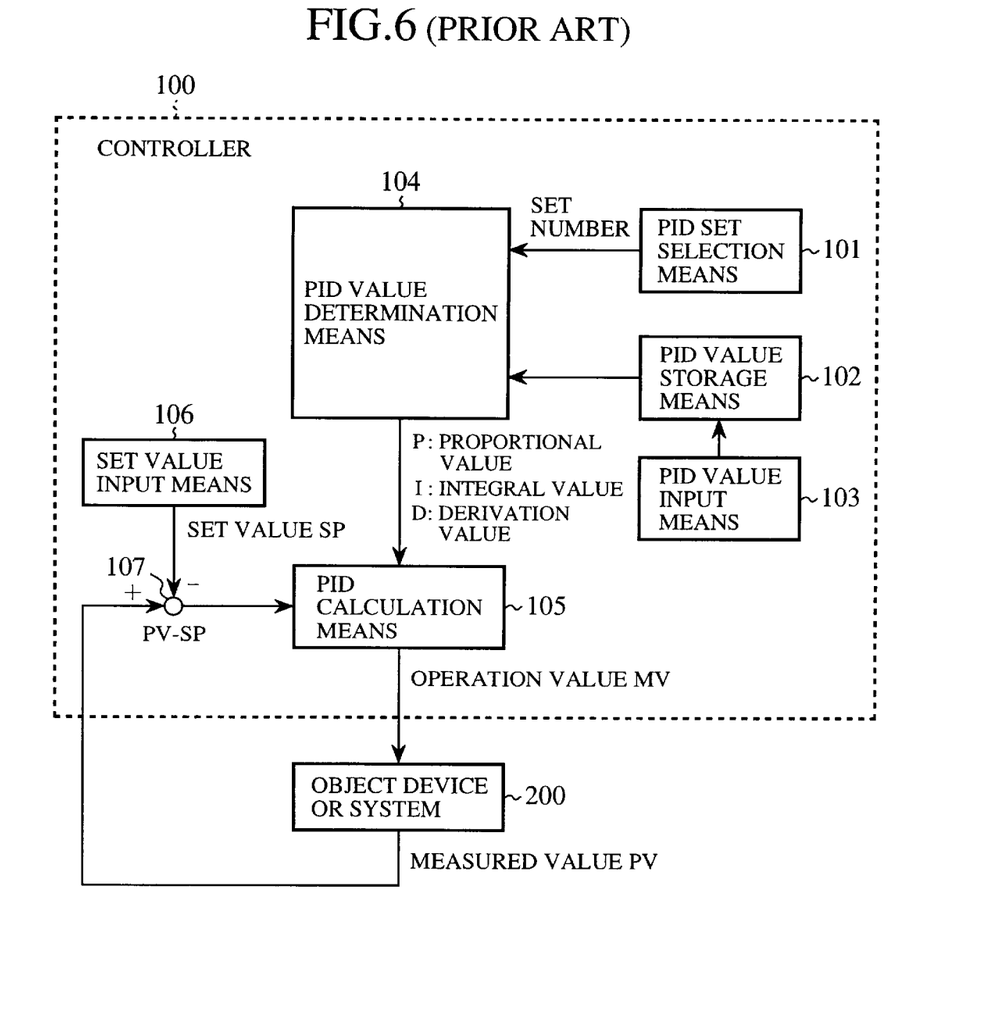
FIG. 6 is a block diagram showing a configuration of a conventional controller having a PID selection function.

FIG. 6 is a block diagram showing a configuration of a conventional controller having a PID selection function. In the diagram, reference number 100 designates a controller having a PID selection function, 200 denotes an object device or system to be controlled, 101 indicates a PID set selection means for selecting a set of a P (Proportional) value, an I (Integral) value, and a D (Derivative) value. Reference number 102 designates a PID value storage means for storing P, I, and D values, 103 denotes a PID value input means through which P values, I values, and D values are inputted. Reference number 104 designates a PID value determination means for determining a set of the P, I, and D values, 105 denotes PID calculation means for calculating an operation value MV based on the P, I, and D values transferred from the PID value determination means 103 and a deviation value (measured value PV–set value SP), and outputting the operation value MV to the object device 200 in order to perform the PID control for the object device 200. Reference number 106 indicates a set value input means for inputting and outputting a set value, and 107 denotes a subtracter for subtracting a set value SP from a measured value PV as an actual process variable.

Next, a description will be given of the operation of the conventional controller having the PID selection function.

In this controller, the PID calculation means 105 performs the PID calculation based on the deviation value (PV–SP) so that the measured value PV of the object device becomes equal to the set value SP, and then calculates the operation value MV. For example, the controller supplies the current corresponding to the operation value MV to a heater (not shown) equipped in the object device 200 so that the temperature of a high-temperature tank measured becomes equal to the desired set temperature.

Generally, in cases where the object device 200 includes different works to be controlled and where different set values SP are used, because the object device 200 is in different environment, it is necessary to use different PID values. That is, it is necessary to change the PID value every changing of the work and the set value SP. In such a conventional controller, the PID value determination means 104 reads the PID value stored in the PID value storage means 102 corresponding to the set number selected by the PID set selection means 101, and outputs the read one to the PID calculation means 105. The PID value storage means 102 stores the PID values in advance, each of which corresponds to its PID set number.

Through the PID value input means 103 incorporated in the controller, the PID values stored in the PID value storage means 102 corresponding to the PID numbers are stored in advance.

The PID set selection means 101 determines the PID set number based on the input through an external input switch or the PID set selection means placed in the controller. For example, the PID set selection means 101 so determines that the PID set number is the value "1" when the external input switch is ON, and determines that the PID set number is the value "2" when OFF.

Figure 7:
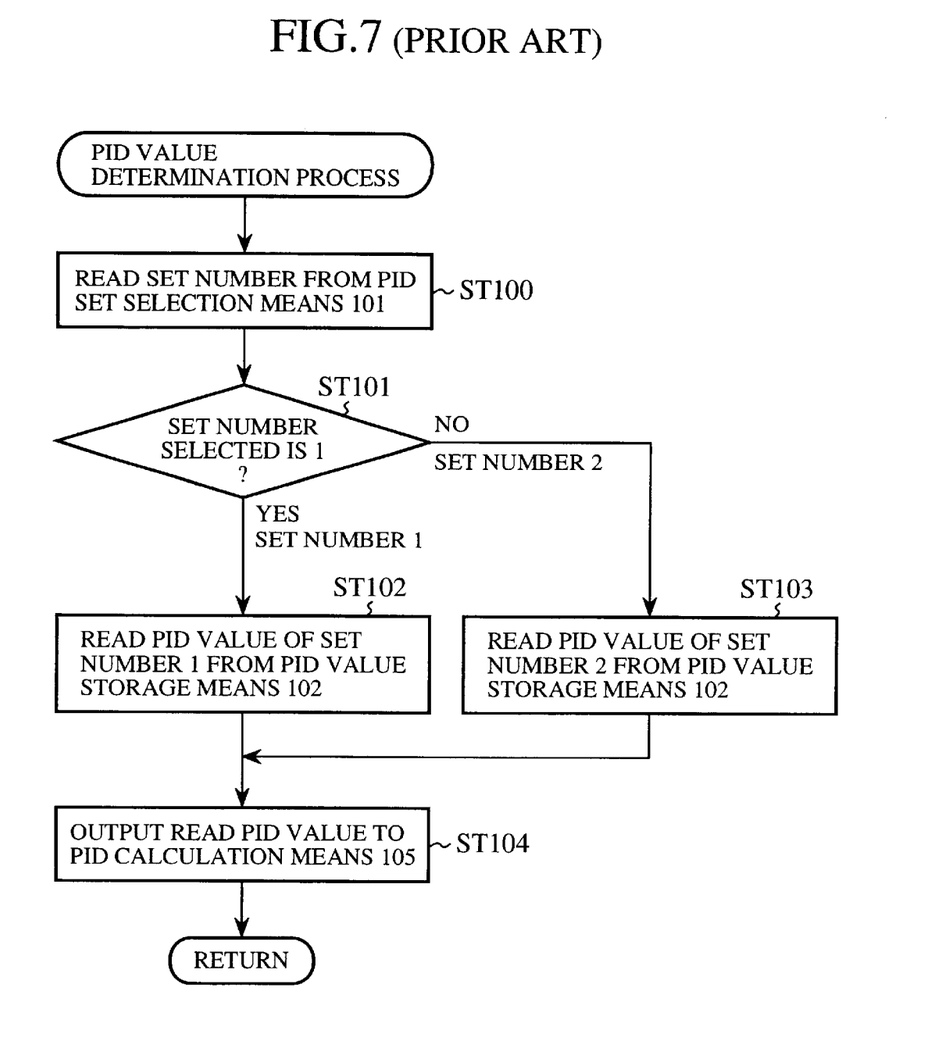
FIG. 7 is a flow chart showing the operation of the PID value determination process in the conventional controller having the PID selection function.

FIG. 7 is a flow chart showing the operation of the PID value determination process in the conventional controller when the PID value is changed.

First, the PID set selection means 101 reads a set number (Step ST100). It is judged whether the set number read is "1" or "2" (Step ST101). When the set number is "1", the PID value storage means 102 reads the PID value corresponding to the set number "1" (Step ST102). On the contrary, the judgment result in the Step ST101 indicates the set number is "2", the PID value corresponding to the set number "2" is read from the PID value storage means 102 (Step ST103). The PID value read in Step ST102 or ST103 is outputted to the PID calculation means 105. When receiving the PID value, the PID calculation means 105 calculates new operation value MV (Step ST104), and then outputs the calculated one to the object device 200.

Because the conventional controller having the PID selection function has the configuration described above, the PID value to be supplied to the PID calculation means 105 is rapidly changed in the changing process of the PID value. This causes that a new operation value MV from the PID calculation means 105 is rapidly changed, so that it is difficult to perform the correct control for the object device in the changing process of the PID value.

SUMMARY OF THE INVENTION

The present invention has been made to solve the drawback involved in the conventional controller having the PID selection function. It is therefore an object of the present invention to provide a controller having a PID selection function capable of suppressing the rapid change of the operation value to be supplied to an object device or system when the PID value is changed and capable of controlling the object device or system smoothly and continuously.

According to an aspect of the present invention, there is provided a controller having a PID selection function of performing PID calculation so that a measured value of an object device or system to be controlled is reached to a set value and of calculating an operation value to be supplied to the object device or system based on the PID value calculated. The controller of the present invention has a PID set selection means and a PID value determination means. The PID set selection means selects a set number of the PID value. The PID value determination means performs PID calculation in order to determine a PID value based on a current PID value of the set number currently selected by the PID set selection means, a previous PID value of the set number previously selected by the PID set selection means, and a switch time to switch the previous PID value to the current PID value.

Further, according to another aspect of the present invention, the PID value determination means in the controller determines the PID value based on fuzzy inference using a switch time as a parameter, the PID value corresponding to the PID set number currently selected, and the PID value of the set number previously selected.

Still further, according to another aspect of the present invention, the PID value determination means in the controller calculates the switch time based on a D value as a derivative time of the PID value corresponding to the set number selected by the PID set selection means.

BRIEF DESCRIPTION OF THE DRAWINGS

Other objects, features and advantages of the present invention will become apparent from the following description taken in conjunction with the accompanying drawings, in which.

DETAILED DESCRIPTION OF THE PREFERRED EMBODIMENTS

A detailed description will be given, with reference to the accompanying drawings, of the preferred embodiment of the present invention.

Embodiment

Figure 1:
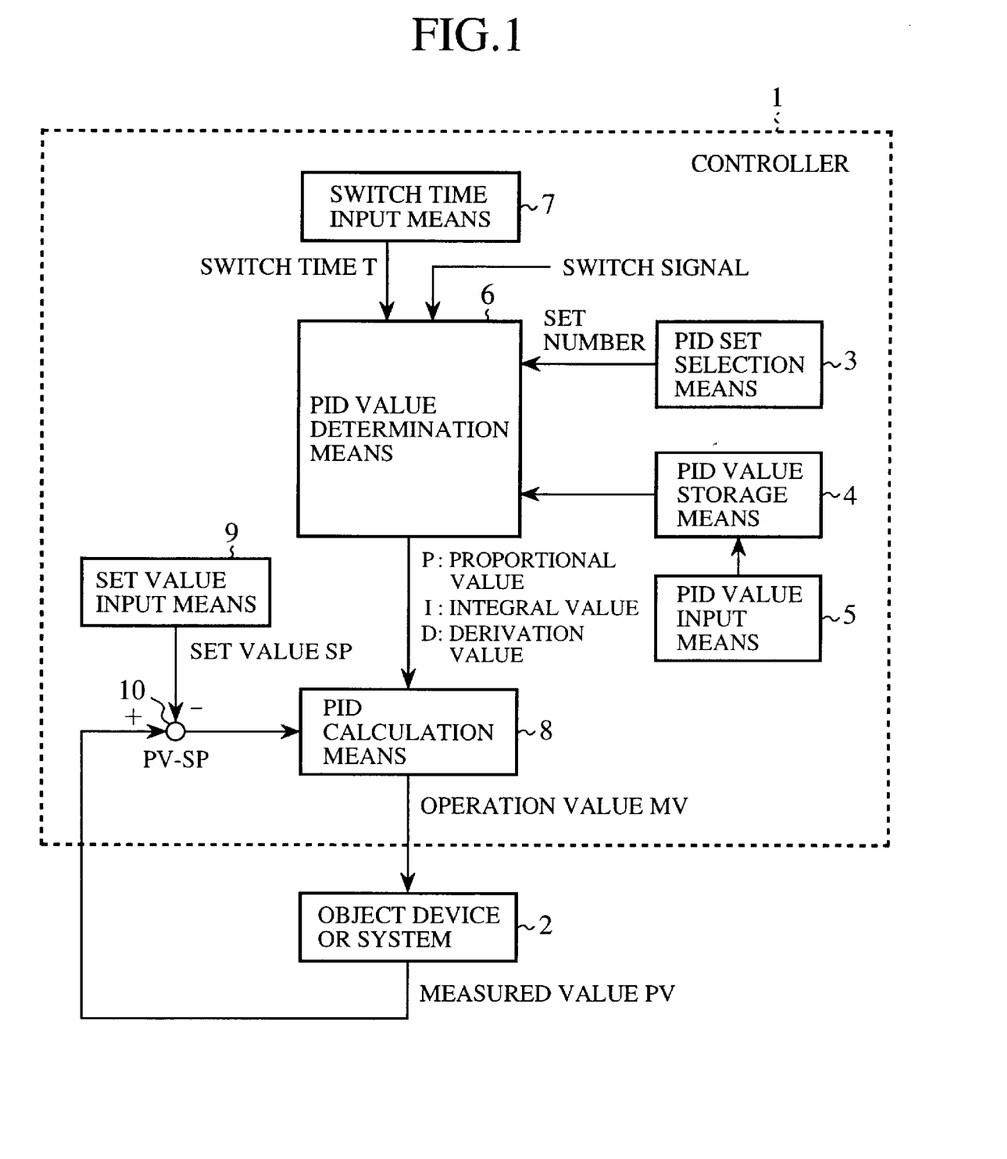
FIG. 1 is a block diagram showing a configuration of a controller having a PID selection function according to an embodiment of the present invention.

FIG. 1 is a block diagram showing a configuration of a controller having a PID selection function according to an embodiment of the present invention. In the diagram, reference number 1 designates a controller having a PID selection function, 2 denotes an object device or system to be controlled by the controller of the present invention, and 3 indicates a PID set selection means for selecting a set of a P (Proportional) value, an I (Integral) value, and a D (Derivative) value. Reference number 4 designates a PID value storage means for storing the P, I, and D values, and 5 denotes a PID value input means through which P, I, and D values are inputted into the PID value storage means 4. Reference number 6 indicates a PID value determination means for determining the P, I, and D values. Reference number 7 designates a switch time input means through which an operator can input a switch time T to switch the current PID value to another PID value by manual. Reference number 8 denotes a PID calculation means for calculating the operation value MV based on the derivation (the measured value (as an actual process variable) PV–the set value SP) and the P, I, and D values transferred from the PID value determination means 6, and then outputting the calculated one as the operation value to the object device or system in order to perform the PID control for the object device or system. Reference number 9 designates a set value input means through which the set value PS is inputted. Reference number 10 indicates a subtracter for obtaining a deviation value by subtracting the measured value (as the actual process variable) PV from the set value SP.

Figure 2:
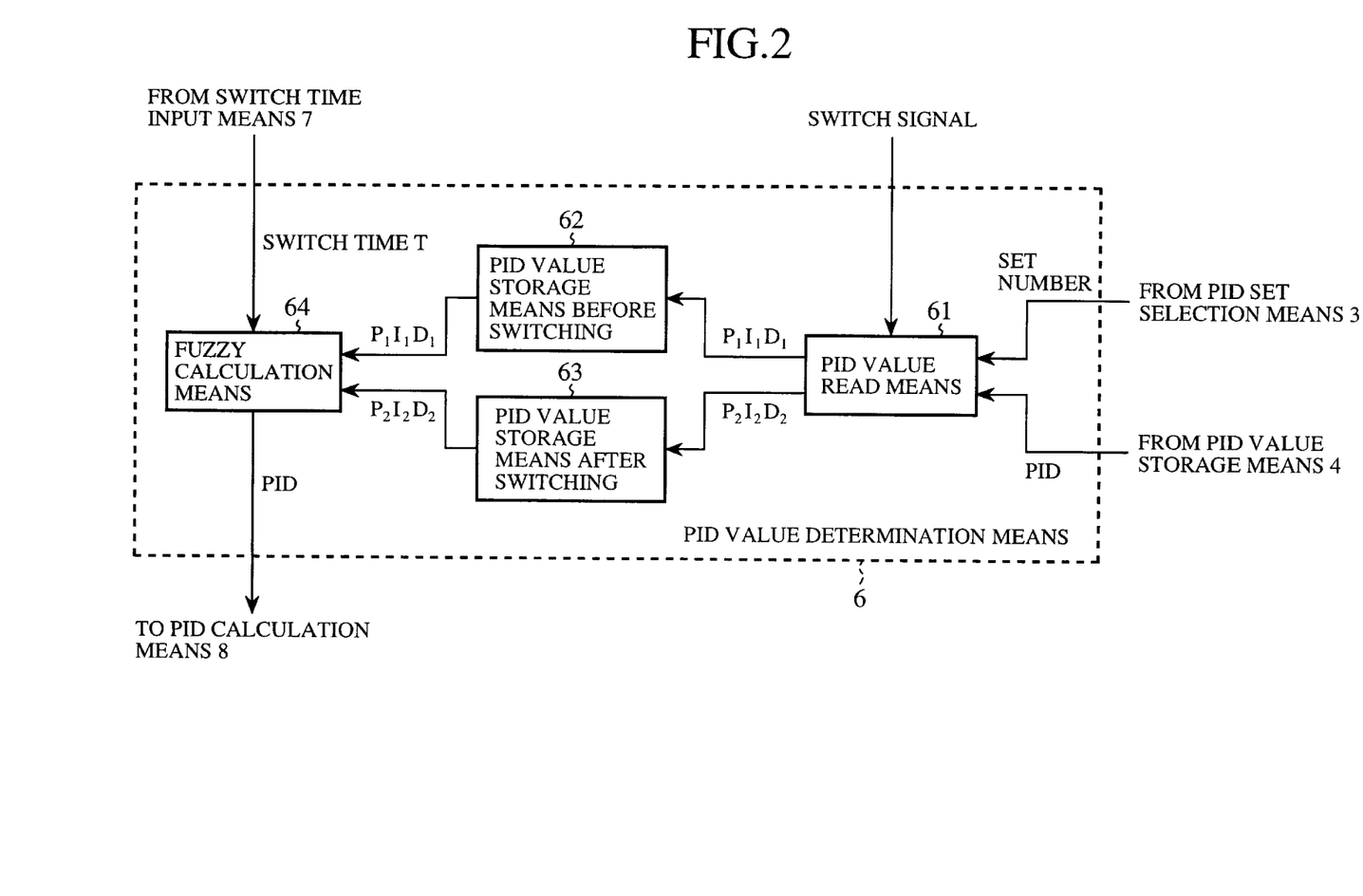
FIG. 2 is a block diagram showing a configuration of a PID value determination means in the controller having the PID selection function according to the embodiment of the present invention.

FIG. 2 is a block diagram showing a detailed configuration of the PID value determination means 6 shown in FIG. 1. In the diagram, reference number 61 designates a PID value read means for reading the PID value selected by the PID value selection means 3 from the PID value storage means 4, 62 indicates a PID value storage means for storing the PID value ($P_1$, $I_1$, $D_1$) before switching of the PID value, and 63 indicates a PID value storage means for storing the PID value ($P_2$, $I_2$, $D_2$) after switching of the PID value. Reference number 64 designates a fuzzy calculation means capable of calculating and determining the switch time T automatically from f(D) based on the D-value because the response characteristic of the system including the object device to be controlled depends on D-value in the PID value, where, "f" is a desired function to calculate the switch time T.

The switch time T calculated based on the function "f" becomes a large value when the control system of a quick response characteristic is switched to the control system of a slow response characteristic. On the contrary, it becomes a small value when the control system of a slow response characteristic is switched to the control system of the rapid response characteristic.

The fuzzy calculation means 64 performs the fuzzy calculation using the switch time T, the PID value ($P_1$, $I_1$, $D_1$) before the switching process stored in the PID value storage means 62, and the PID value ($P_2$, $I_2$, $D_2$) after the switching process stored in the PID value storage means 63, and outputs the calculated PID value (P, I, D) to the PID calculation means 8, where the switch time T is inputted through the switch time input means 7 by manual or calculated and determined automatically by the manner described above.

Next, a description will now be given of the operation of the controller.

First, the entire operation of the controller having the PID selection function according to the embodiment will be explained.

The PID calculation means 8 in the controller performs the PID calculation based on the deviation (PV–SP) so that the measured value PV of the object device is reached to the set value SP in order to obtain the operation value MV. In this case, a different PID value is used when the work (as a target to be controlled) in the object device or system and the set value is changed because the circumstance also becomes changed. That is, a different PID value is used according to the change of the target work or the set value. Thus, when the change regarding the target work or the set value occurs, the PID value determination means 6 determines the optimum PID value for each state and then outputs the determined one to the PID calculation means 8.

The PID value determination means 6 performs the fuzzy calculation using the switch time T, the PID value ($P_1$, $I_1$, $D_1$) before switching and the PID value ($P_2$, $I_2$, $D_2$) after switching, and outputs the calculated PID value (P, I, D) to the PID calculation means 8.

The PID calculation means 8 performs the PID calculation using the PID value (P, I, D) transferred from the PID determination means 6, and obtains the operation value MV so that the deviation (PV–SP) becomes zero. The PID calculation means 8 then outputs the operation value MV to the object device or system 2 in order to control it smoothly and continuously. Thereby, the measured value PV becomes equal to the set value SP.

As described above, the PID value determination means 6 determines the PID value (P, I, D) to be outputted to the PID calculation means 8. When the target work in the object device or system 2 to be controlled or the set value as the object value is changed, the PID value determination means 6 determines the new PID value according to the present situation by the fuzzy inference using the switch time T as the parameter calculated according to the response characteristic of the object device or system to be controlled based on the PID value $(P_1, I_1, D_1)$ before the switching and the PID value $(P_2, I_2, D_2)$ after the switching. Thereby, the controller can perform the control for the object device or system smoothly and continuously without any rapid change of the operation value caused by the rapid change of the PID value.

Figure 5:
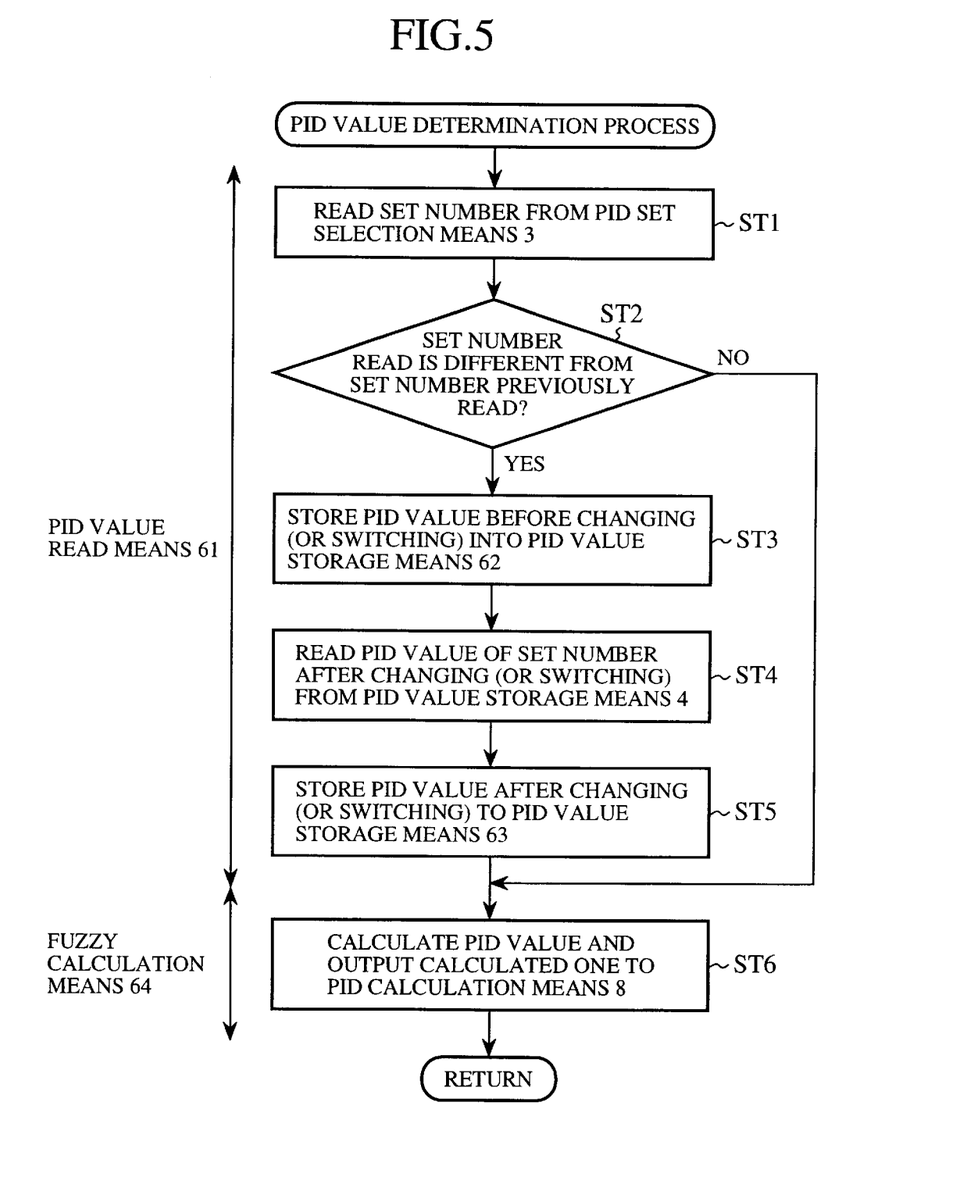
FIG. 5 is a flow chart showing the PID value determination process in the controller having the PID selection function according to the embodiment of the present invention.

FIG. 5 is a flow chart showing the PID value determination process by the PID value determination means 6.

The operation of this PID value determination means 6 will be explained with reference to FIG. 5.

In the following case, the PID set selection means 3 has selected the PID value $(P_1, I_1, D_1)$ of the set number 1 before the switching and selects the PID value $(P_2, I_2, D_2)$ of the set number 2 after the switching. When receiving the switch signal, the PID value determination means 6 performs the switching process of the PID value.

The switch time T is calculated based on the D value as the derivation time according to the response characteristic of the object device or system to be controlled, which corresponds to the set number of the PID value selected by the PID set selection means 3.

The D value as the derivation time becomes a large value in a slow response control system and a small value in a rapid response control system. Because, when the controller switched the device or system to be controlled from the rapid response control system to the slow control response system, the switch time T becomes a large value. On the contrary, when the controller switches the object device or system from the slow response control system to the rapid response control system, the switch time T becomes a small value.

If the switch time T is set to a large value when the controller switches from the slow response control system to the rapid response control system, there is1 a possibility that the operation value PV is rapidly changed because the operation value PV is influenced considerably by the PID value before the switching. In order to avoid this rapid change and realize the stable control, the controller sets the switch time T of a small value.

In a case that the D value $(D_2)$ of the set number 2 after the changing is zero, the controller sets the switch time to a predetermined constant value that is prepared in advance.

According to the flow chart shown in FIG. 5, first, the set number selected by the PID set selection means 3 is read (Step ST1).

It is judged whether or not the set number currently read by the PID set selection means 3 is different from the set number previously read (Step ST2). When the judgment result indicates the change of the set number, the PID value (before the switching) corresponding to the set number previously read is stored in the PID storage means 62 before the switching (Step ST3).

Following this, the PID value (after the switching) corresponding to the set number currently read is read from the PID value storage means 4 (Step ST4).

The PID value corresponding to the set number currently read is stored into the PID value storage means 63 after the switching (Step ST5).

Figure 3:
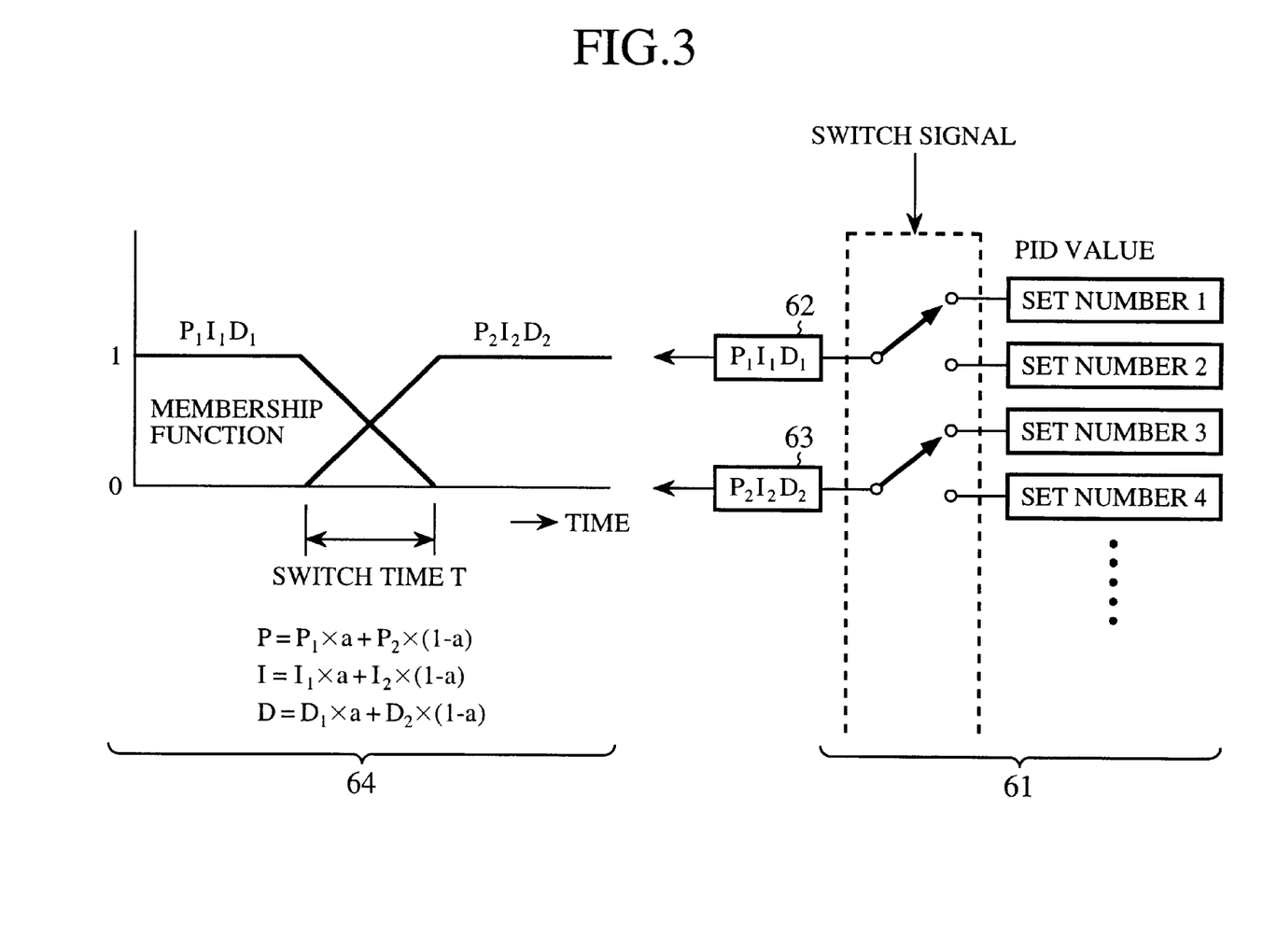
FIG. 3 is a diagram showing a concept of the operation of the PID value determination means in the controller having the PID selection function according to the embodiment of the present invention.
Figure 4:
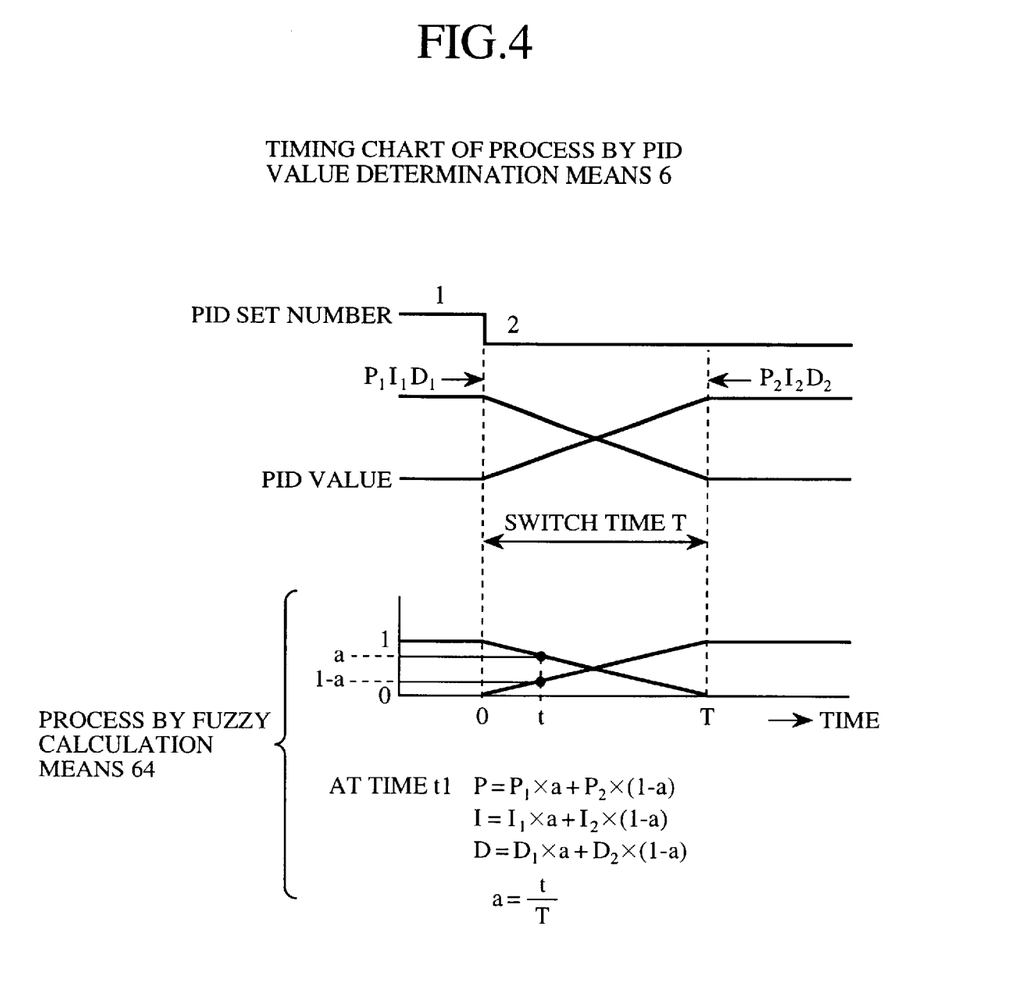
FIG. 4 is a diagram to explain the calculation process of a PID value by a fuzzy calculation means in the PID value determination means in the controller having the PID selection function according to the embodiment of the present invention.

As shown in FIG. 3 and FIG. 4, the fuzzy calculation means 64 calculates the PID value (P, I, D) using the PID value $(P_1, I_1, D_1)$ of the set number previously read, the PID value $(P_2, I_2, D_2)$ of the set number currently read, and the switch time T based on fuzzy inference. The fuzzy calculation means 64 then outputs the PID value (P, I, D) calculated to the PID calculation means 8 (Step ST6).

As shown in FIG. 4, the fuzzy calculation means 64 calculates the PID value (P, I, D) at the time "t" within the switch time T, for example, $t/T=a$, P value=$P_1 a + P_2(1-a)$, I value=$I_1 a + I_2(1-a)$, and D value=$D_1 a + D_2(1-a)$.

In Step ST2, when there is no difference between the set value currently read and the set value previously read, the operation progresses from Step ST2 to step ST6 (see FIG. 5). In Step ST6, the fuzzy calculation means 64 calculates the PID value (P, I, D) using the PID value of the set number previously read and the switch time T and then outputs the calculated one to the PID calculation means 8 (Step ST6).

The switch signal received by the PID value determination means 6 is generated based on event information that the controller having the PID selection function has. The event information is information presenting states such as a PV/SV value (where PV is measured by an instrument), a deviation value (PV−SP), an internal timer, and so on. For example, in a case that the set number of the PID value is changed based on the deviation value as one of the event information, when the deviation value is a large value, the PID value of the set number 1 is selected, and when the deviation value is a small value, the PID value of the set number 2 is used. Accordingly, it is possible to automatically select the optimum PID value for the state of the object device or system to be controlled. On the contrary, it is possible that the user sets a set number in advance in order to select the PID value corresponding to this set number.

As one concrete example, it is possible to set the following PID values in advance:

The PID value of the set number 1 is P=5%, I=40s, D=10s have been set in advance and the PID value of the set number 1 is used only when the deviation is not less than 50° C. (as the condition of event information 1);

The PID value of the set number 2 is P=4%, I=80s, D=20s have been set in advance and the PID value of the set number 2 is used only when the deviation value is within the range of 20° C. to 50° C. (as the combinational condition of the event information 1 and the event information 2); and The PID value of the set number 3 is P=10%, I=80s, D=20s have been set in advance and this PID value of the set number 3 is used only when the deviation value is less than 20° C. (as the condition of event information 2).

By the way, the concrete example described above shows the case where ON/OFF signals regarding the event information 1 and the event information 2 measured are used as the trigger/condition for the switching process of the PID value. The present invention is not limited by this example. For example, it is possible to apply the concept of the present invention to use analogue signals such as a PV value and a SP value instead of the event information 1 and the event information 2 measured.

Further, the PID value determination means 6 in the controller according to the present invention performs the smoothly switching of the set number of the PID value using the fuzzy calculation so that the rapid change of the operation value MV does not occur in order to obtain the stable control of the measured value PV, not changes the PID value immediately after the switching condition is satisfied. The switching process of the PID value is performed using two parameters, the switching condition and the elapsed time "t" based on the fuzzy calculation, where the switching condition means that a current PID value (as an ambiguous value) is gradually-changed to a following PID value (as an ambiguous value), and finally the start PID value in the switching process of the PID value is changed to the target PID value.

As described above, according to the embodiment described above, the PID value is determined in consideration of the PID value of the set number selected before the selection of the set number of the current PID value, and the PID value is determined further using the fuzzy calculation. Therefore the present invention has an effect in which it is possible to avoid any rapid change of the operation value PV and to perform the continuous and smooth control to the object device or system even if the PID value is rapidly changed.

As set forth, according to the present invention, the controller has the PID set selection means and the PID value determination means, where a PID value determination means performs the PID calculation in order to determine a PID value based on a current PID value of the set number currently selected by the PID set selection means, a previous PID value of the set number previously selected by the PID set selection means, and a switch time to switch the previous PID value to the current PID value. Accordingly, the PID value is determined by performing the PID calculation in consideration of the PID value of the set number that was previously selected before the selection of the PID value of the current set value. The present invention therefore has the effect that it is possible to suppress the rapid change of the operation value when the PID value is changed, and to control the object device or system smoothly and continuously.

According to the present invention, because the PID value determination means determines the PID value based on fuzzy inference using the switch time as a parameter, the PID value corresponding to the PID set number currently selected, and the PID value of the set number previously selected, the present invention has the effect that it is possible to suppress the rapid change of the operation value when the PID value is changed, and to control the object device or system smoothly and continuously.

In addition, according to the present invention, because the PID value determination means calculates the switch time based on D value as a derivative time of the PID value corresponding to the set number selected by the PID set selection means, the switch time becomes a time length corresponding to the response characteristic of the object device or system. Accordingly, when the response speed of the object device or system is high, the switch time becomes a short value, and when slow, the switch time becomes a long value. Therefore the present invention has the effect that it is possible to suppress the rapid change of the operation value when the PID value is changed, and to control the object device or system smoothly and continuously.

While the above provides a full and complete disclosure of the preferred embodiments of the present invention, various modifications, alternate constructions and equivalents may be employed without departing from the scope of the invention. Therefore the above description and illustration should not be construed as limiting the scope of the invention, which is defined by the appended claims.

What is claimed is:

1. A controller having a PID selection function of performing PID calculation so that a measured value of an object system to be controlled is reached to a set value and calculating an operation value to be supplied to the object system based on the PID value calculated, comprising:

PID set selection means selecting a set number of the PID value; and

PID value determination means performing PID calculation in order to determine a PID value based on a current PID value of the set number currently selected by the PID set selection means, a previous PID value of the set number previously selected by the PID set selection means, and a switch time to switch the previous PID value to the current PID value.

2. The controller having the PID selection function according to claim 1, wherein the PID value determination means determines the PID value based on fuzzy inference using a switch time as a parameter, the PID value corresponding to the PID set number currently selected, and the PID value of the set number previously selected.

3. The controller having the PID selection function according to claim 1, wherein the PID value determination means calculates the switch time based on a D value as a derivative time of the PID value corresponding to the set number selected by the PID set selection means.

4. The controller having the PID selection function according to claim 2, wherein the PID value determination means calculates the switch time based on a D value as a derivative time of the PID value corresponding to the set number selected by the PID set selection means.

5. The controller having the PID selection function according to claim 1, further comprises PID calculation means calculating the operation value to be supplied to the object system using a difference between the set value and the measured value obtained from the object system, and the PID value outputted from the PID value determination means.

6. The controller having the PID selection function according to claim 1, further comprises set value input means inputting the set value.

7. The controller having the PID selection function according to claim 1, further comprises switch means inputting the switch time.

8. The controller having the PID selection function according to claim 1, further comprises PID value storage means storing the PID value corresponding to the set number of the PID value selected by the PID set selection means.

9. The controller having the PID selection function according to claim 1, further comprises PID value input means through which PID values are stored in advance.

* * * * *